US008377208B2

(12) United States Patent
Jung et al.

(10) Patent No.: US 8,377,208 B2
(45) Date of Patent: Feb. 19, 2013

(54) SYSTEM AND METHOD FOR MANUFACTURING POLYCRYSTAL SILICON

(75) Inventors: Yunsub Jung, Seoul (KR); Keunho Kim, Ulsan (KR); Yeokyun Yoon, Daejeon (KR); Ted Kim, Daejeon (KR)

(73) Assignee: Siliconvalue LLC., Daejeon (KR)

( * ) Notice: Subject to any disclaimer, the term of this patent is extended or adjusted under 35 U.S.C. 154(b) by 0 days.

(21) Appl. No.: 13/247,587

(22) Filed: Sep. 28, 2011

(65) Prior Publication Data

US 2012/0269712 A1 Oct. 25, 2012

(30) Foreign Application Priority Data

Apr. 20, 2011 (KR) ........................ 10-2011-0036719

(51) Int. Cl.
*C23C 16/00* (2006.01)
*C23C 16/442* (2006.01)
*C23C 16/24* (2006.01)
*B01J 8/18* (2006.01)
*C01B 33/02* (2006.01)
*G05D 9/00* (2006.01)
*G05D 16/00* (2006.01)

(52) U.S. Cl. ........ 118/716; 422/139; 422/145; 423/348; 423/349; 427/185; 427/213; 427/248.1; 427/255.23; 427/255.28; 427/255.393

(58) Field of Classification Search ................. 118/716; 422/139, 145; 423/348, 349; 427/255.23, 427/255.28, 248.1, 255.393, 185, 213

See application file for complete search history.

(56) References Cited

U.S. PATENT DOCUMENTS

| 4,642,227 | A |   | 2/1987  | Flagan et al. |
| 5,363,812 | A | * | 11/1994 | Belin et al. ..................... 122/4 D |
| 5,480,617 | A | * | 1/1996  | Uhlemann et al. ............ 422/140 |
| 5,533,471 | A | * | 7/1996  | Hyppanen ..................... 122/4 D |
| 5,752,327 | A | * | 5/1998  | Biallas et al. .................... 34/359 |
| 5,800,876 | A | * | 9/1998  | Borner et al. ................. 427/459 |
| 6,007,869 | A |   | 12/1999 | Schreieder et al. |
| 6,494,645 | B1| * | 12/2002 | Seitz et al. ...................... 406/24 |
| 7,771,687 | B2| * | 8/2010  | Kim et al. ..................... 423/348 |
| 7,972,562 | B2| * | 7/2011  | Kim et al. ..................... 422/112 |
| 8,017,024 | B2| * | 9/2011  | Kim et al. ........................ 216/37 |
| 8,114,352 | B2| * | 2/2012  | Kim et al. ..................... 422/112 |
| 8,116,992 | B1| * | 2/2012  | Ludlow et al. .................. 702/47 |

(Continued)

FOREIGN PATENT DOCUMENTS

WO 2007/012027 A2 1/2007
WO 2007/091834 A1 8/2007

*Primary Examiner* — Jeffrie R Lund
(74) *Attorney, Agent, or Firm* — Patent Office of Dr. Chung Park (57) ABSTRACT

A polycrystal silicon manufacturing apparatus and a method of manufacturing polycrystal silicon using the same are disclosed. The polycrystal silicon manufacturing apparatus includes a reaction pipe comprising silicon particles provided therein; a flowing-gas supply unit configured to supply flowing gas to the silicon particles provided in the reaction pipe; and a first pressure sensor configured to measure a pressure of a first area in the reaction pipe; a second pressure sensor configured to measure a pressure of a second area in the reaction pipe; and a particle outlet configured to exhaust polycrystal silicon formed in the reaction pipe outside, when a difference between a first pressure measured by the first pressure sensor and a second pressure measured by the second pressure sensor is a reference pressure value or more.

17 Claims, 3 Drawing Sheets

U.S. PATENT DOCUMENTS

| | | | |
|---|---|---|---|
| 2001/0034422 A1* | 10/2001 | Hartley et al. | 526/88 |
| 2008/0267834 A1* | 10/2008 | Kim et al. | 422/139 |
| 2008/0268143 A1* | 10/2008 | Vahlas et al. | 427/185 |
| 2009/0004090 A1* | 1/2009 | Kim et al. | 423/349 |
| 2009/0047204 A1* | 2/2009 | Kim et al. | 423/349 |
| 2010/0024297 A1* | 2/2010 | Suda et al. | 48/61 |
| 2010/0044342 A1 | 2/2010 | Kim et al. | |
| 2010/0047136 A1* | 2/2010 | Kim et al. | 422/112 |
| 2010/0068116 A1* | 3/2010 | Kim et al. | 423/349 |
| 2012/0082592 A1* | 4/2012 | Jung et al. | 422/146 |

* cited by examiner

SYSTEM AND METHOD FOR MANUFACTURING POLYCRYSTAL SILICON

CROSS-REFERENCE TO RELATED APPLICATION

This application claims priority under 35 U.S.C. §119 from Korean Application No. 10-2011-0036719 filed on Apr. 20, 2011, the subject matter of which is incorporated herein by reference.

BACKGROUND

1. Field

The present invention relates to a polycrystal silicon manufacturing apparatus and a method of manufacturing polycrystal silicon using the same.

2. Background

Generally, high purity polycrystal silicon has been consumed broadly for a semiconductor element that is useable for a semiconductor device or a solar cell, a chemical material that requires a high purity or an industrial element. Also, the high purity polycrystal silicon has be utilized for a precision functioned device or a precision part of a highly integrated micro system.

To fabricate such polycrystal silicon, silicon deposition has been used. According to the silicon deposition, silicon contained in reaction gas is constantly deposited by pyrolysis of reaction gas and hydrogen reaction.

However, for a serial operation of the fluidized bed reactor that is a good characteristic of the fluidized bed reactor, seed silicon filled into a fluidized bed has to grow to be a proper sized one that is able to be produced via deposition reaction. After that, a corresponding product has to be exhausted and the serial operation of the fluidized bed reactor may be enabled. In other words, a proper point for the silicon exhaustion may be set during the operation of the fluidized bed reactor. Different from that, silicon may be exhausted based on heuristics and productivity of silicon may be enhanced by a serial process. However, this method cannot be provided although it is recognized.

As a result, demands for a method of manufacturing polycrystal silicon particles serially and stably, with a high productivity and a low production price have been increased.

SUMMARY

Accordingly, the embodiments may be directed to a polycrystal silicon manufacturing apparatus and a method of manufacturing polycrystal silicon using the same. An object of the embodiments is to provide a polycrystal silicon manufacturing apparatus which is able to manufacture polycrystal silicon serially and stably.

Another object of the embodiments is to provide a polycrystal silicon manufacturing apparatus having enhanced productivity and a reduced production price.

To achieve these objects and other advantages and in accordance with the purpose of the embodiments, as embodied and broadly described herein, a polycrystal silicon manufacturing apparatus includes a reaction pipe comprising silicon particles provided therein; a flowing-gas supply unit configured to supply flowing gas to the silicon particles provided in the reaction pipe; and a first pressure sensor configured to measure a pressure of a first area in the reaction pipe; a second pressure sensor configured to measure a pressure of a second area in the reaction pipe; and a particle outlet configured to exhaust polycrystal silicon formed in the reaction pipe outside, when a difference between a first pressure measured by the first pressure sensor and a second pressure measured by the second pressure sensor is a reference pressure value or more.

The first pressure sensor may be arranged in the flowing-gas supply unit.

The polycrystal silicon manufacturing apparatus may further include a gas outlet configured to exhaust gas generated in silicon deposition reaction in the reaction gas pipe outside, wherein the second pressure sensor is arranged in the gas outlet.

The polycrystal silicon manufacturing apparatus may further include a control unit configured to operate the particle outlet to exhaust the polycrystal silicon outside, when a difference between the first pressure and the second pressure compared with each other is a reference pressure value or more.

The first area may be an area in which a maximum pressure is measured in the reaction pipe and the second area may be an area in which a minimum pressure is measured in the reaction pipe.

The reaction pipe may be formed of a material selected from a group configured of quartz, silica, silicon nitride, boron nitride, zirconia, yttria, silicon carbide, graphite, silicon and a vitreous carbon.

One of silicon, silica, quartz and silicon nitride may be lined on an inner wall of the reaction pipe, when the reaction pipe is formed of a carbon containing material.

In another aspect, a polycrystal silicon manufacturing apparatus includes a reaction pipe comprising silicon particles provided therein; a flowing-gas supply unit configured to supply flowing gas to the silicon particles provided in the reaction pipe; and a pressure sensor arranged in the flowing-gas supply unit; and a particle outlet configured to exhaust polycrystal silicon formed in the reaction pipe outside, when a pressure measured by the pressure sensor is a reference pressure value or more.

The polycrystal silicon manufacturing apparatus may further include a lower part having the flowing-gas supply unit assembled thereto, wherein the bottom part comprises a lower plate, a first plate, a second plate and a third plate that are multilayered sequentially.

Each of the second and third plates may include a plurality of unit-plates.

An insulation ring may be provided to cover a rim of the second plate.

An end of the second plate may be spaced apart a predetermined distance from a surface of the lower plate.

A predetermined area of the first plate may be located between the lower plate and an end of the second plate.

In a further aspect, a method of manufacturing polycrystal silicon includes steps of: generating silicon deposition reaction by supplying reaction gas and flowing gas to a reaction pipe; measuring a first pressure of a first area in the reaction pipe; measuring a second pressure of a second area that is different from the first area in the reaction pipe; and exhausting polycrystal silicon generated in the reaction pipe, when a difference between the first pressure and the second pressure is a reference pressure value or more.

The first area is an area in which the flowing gas or the reaction gas is filled in the reaction pipe.

The second area may be an area in which gas generated during the silicon deposition reaction is exhausted.

As a result, the polycrystal silicon manufacturing apparatus according to the embodiments may include a control unit that is able to control a point of exhausting silicon particles automatically. Because of that, automation of polycrystal silicon production may be enabled.

Furthermore, according to the embodiments, mass production of polycrystal silicon may be enabled by the automation control and the production price may be lowered.

It is to be understood that both the foregoing general description and the following detailed description of the embodiments or arrangements are exemplary and explanatory and are intended to provide further explanation of the embodiments as claimed.

BRIEF DESCRIPTION OF THE DRAWINGS

Arrangements and embodiments may be described in detail with reference to the following drawings in which like reference numerals refer to like elements and wherein.

DETAILED DESCRIPTION

Reference may now be made in detail to specific embodiments, examples of which may be illustrated in the accompanying drawings. Wherever possible, same reference numbers may be used throughout the drawings to refer to the same or like parts.

Figure 1:
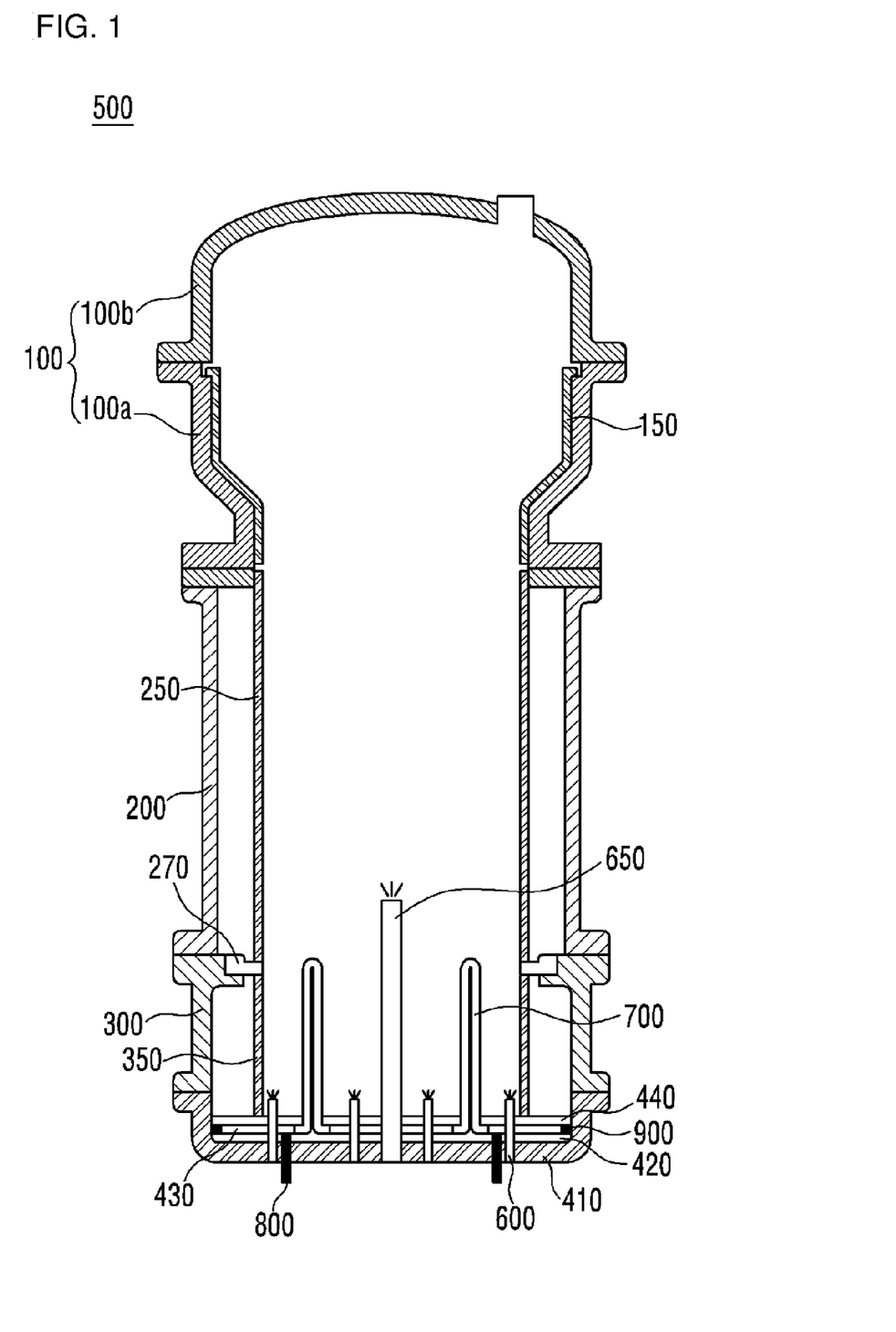
FIG. 1 is a diagram schematically illustrating a polycrystal silicon manufacturing apparatus according to an exemplary embodiment.

FIG. 1 illustrates a polycrystal silicon manufacturing apparatus according to an exemplary embodiment. As shown in FIG. 1, a polycrystal silicon manufacturing apparatus 500 according to an exemplary embodiment may include a head 100, a first body part 200, a second body part 300 and a bottom part 400.

The head 100 may be connected with the first body part 200 and it may have a larger diameter than a diameter of a first reaction pipe 250 provided in the first body part 200. When gas and microelements within the polycrystal silicon apparatus 500 pass the head 100 from the first reaction pipe 250, the velocity of gas and microelements may decrease because of the larger diameter possessed by the head 100.

As a result, load of a post-process for the exhausted gas or microelements may be reduced. An inner wall of the head 100 may be formed of an inorganic material that will not be transformed at a high temperature. For example, the inner wall of the head 100 may be formed of at least one of quartz, silica, silicon nitride, boron nitride, zirconia, silicon carbide, graphite, silicon and vitreous carbon.

Also, at least one of coating or lining that uses an organic polymer may be performed to the inner wall of the head 100, if it is possible to cool an outer wall of the head 100.

When the inner wall of the head 100 is formed of a carbon containing material such as silicon carbide, graphite and vitreous carbon, polycrystal silicon may be contaminated by carbon impurities. Because of that, silicon, silica, quartz or silicon nitride may be coated or lined on the inner wall of the head 100 which could contact with the polycrystal silicon.

For example, the head 100 may include a plurality of heads 100a and 100b. A lining layer 150 may be located on an inner surface of the first head 100a.

The first body part 200 may be located under the head 100, connected with the head 100, and it may provide a predetermined space where polycrystal silicon deposition reaction may occur.

The second body part 300 may be located under the first body part 200, with connected with the first body part 200. Together with the first body part 200, the second body part 300 may provide a predetermined space where at least one of polycrystal silicon deposition reaction or heating reaction may occur.

Those first and second body parts 200 and 300 may be independently provided and they may be coupled to each other to provide a reaction space. Alternatively, the first and second body parts 200 and 300 may be integrally formed with each other.

The bottom part 400 may be located under the second body part 300, with connected with the second body part 300. A variety of nozzles 600 and 650, a heater 700 and an electrode 800 may be coupled to the bottom part 400 for the polycrystal silicon deposition.

In the meanwhile, the head 100, the first body part 200 and the second body part 300 may be formed of a proper metal material that is easy to treat with good mechanical strength and rigidity such as carbon steel, stainless steel and various steel alloys. A protection layer for the first and second body parts 200 and 300 formed of the material mentioned above may be formed of metal, organic polymer, ceramic or quartz.

When assembling the head 100, the first body part 200 and the second body part 300 to each other, a gasket or a sealing material may be used to shut off the inside of the reactor from external space. Each of the first and second body parts 200 and 300 may have a variety of shapes including a cylindrical pipe, a flange, a tube, a fitting, a plate, a corn, an oval or a jacket having a cooling medium flowing between double-framed walls.

Also, when the head 100, the first body part 200 and the second body part 300 are formed of the metal material, a protection layer may be coated on an inner surface possessed by each of them or a protection pipe or a protection wall may be installed additionally. The protection layer, pipe or wall may be formed of a metal material. However, a non-metal material such as organic polymer, ceramic and quartz may be coated or lined on the protection layer, pipe or wall to prevent contamination inside the reactor.

The first and second body parts 200 and 300 may be maintained blow a predetermined range of temperatures by cooling fluid such as water, oil, gas and air, to prevent heat expansion, to protect workers and to prevent accidents. Inner or outer walls of components provided in the first and second body parts 200 and 300 that need cooling may be fabricated to allow the cooling fluid to circulate there through.

In the meanwhile, an insulator may be arranged on an outer surface of each of the first and second body parts 200 and 300 to protect workers and to prevent too much heat loss.

As follows, a process of assembling a polycrystal silicon manufacturing apparatus according to an embodiment will be described.

A first reaction pipe 250 may be assembled to be located inside the first body part 200 and a second reaction pipe 350 may be assembled to be located inside the second body part 300. Various nozzles 600 and 650, an electrode 800 and a heater 700 are assembled to the bottom part 400 configured to close a bottom of the second body part 300 airtight. The bottom part 400 may be connected with a lower area of the second body part 300 having the second reaction pipe 350 provided therein. After that, the first body part 200 and the second body part 300 may be connected with each other and the head 100 may be connected with the first body part 200.

Various gas supply units assembled to the bottom part 400 may include a flowing-gas supply unit 600 and a reaction gas supply unit 650.

The first and second reaction pipes 250 and 350 may be tube-shaped or partially tube-shaped, corn-shaped and oval-shaped. Each end of the first and second reaction pipes 250 and 350 may be processed to be a flange type. The first and second reaction pipes 250 and 350 may be configured of a plurality of parts and some of the parts may be arranged on inner walls of the first and second body parts 200 and 300 as liners.

The first and second reaction pipes 250 and 350 may be formed of an inorganic material that is not transformed easily at a high temperature. The inorganic material may be quartz, silica, silicon nitride, boron nitride, zirconia, yttria, silicon carbide, graphite, silicon, vitreous carbon and a compound of them.

When the first and second reaction pipes 250 and 350 are formed of a carbon containing material such as silicon carbide, graphite, vitreous carbon and the like, the carbon containing material might contaminate the polycrystal silicon. Because of that, silicon, silica, quartz, silicon nitride and the like may be coated or lined on each inner wall of the first and second reaction pipes that can contact with the polycrystal silicon.

The flowing-gas supply unit 600 may be configured to supply flowing-gas that enables silicon particles to flow within the reaction pipe. Some or all of the silicon particles may flow with the flowing-gas. At this time, the flowing-gas may include at least one of hydrogen, nitrogen, argon, helium, hydrogen chloride (HCl), silicon tetra chloride ($SiCl_4$). The flowing-gas supply unit 600 may be a tub, a liner or a molded material.

The reaction gas supply unit 650 may be configured to supply reaction gas that containing silicon elements to a silicon particle layer. The reaction gas is raw material gas that is used in deposition of polycrystal silicon and it may include silicon elements. The reaction gas may include at least one of monosilan ($SiH_4$), disilane ($Si_6H_6$), higher-silane ($Si_nH_{2n+2}$, 'n' is a 3 or more a natural number), dichlide silane (SCS: $SiH_2Cl_2$), trichlide silane (TCS: $SiHCl_3$), tetra chlide silane (STC: $SiCl_4$), dibromosilane ($SiH_2Br_2$), tribromo silane (Si-$HBr_3$), silicontetrabromide ($SiBr_4$), diiodosilane ($SiH_2I_2$), triiodosilane ($SiHI_3$) and silicontetraiodide ($SiI_4$). At this time, the reaction gas may further include at least one of hydrogen, nitrogen, argon, helium or hydrogen chloride. As the reaction gas is supplied, polycrystal silicon is deposited on a surface of a seed crystal having a size of 0.1 to 2 mm and the size of the polycrystal silicon may be increased.

When the size of the polycrystal silicon is increased up to a preset value, the reaction gas may be exhausted outside the polycrystal silicon manufacturing apparatus. The heater 700 may supply heat that is used for generating silicon deposition reaction on the surface of the polycrystal silicon within the polycrystal silicon manufacturing apparatus.

According to the embodiment, the heat used for the silicon deposition reaction may be generated in the reaction pipe. Alternatively, the heat generated outside the reaction pipe 250 may be supplied to the inside of the reaction pipe 250 and the heat may be used for the silicon deposition reaction. The heater 700 may include a resistant to be supplied electricity, to generate and supply the heat. The heater 700 may include at least one of graphite, ceramic such as and a metal material.

A gas outlet may be arranged in the head 100 to exhaust exhaustion gas including the flowing gas, non-reaction gas, reaction generation gas outside. Here, the gas outlet may be operated serially. Minute silicon particles or high molecular reaction by-product transported by the exhaustion gas may be separated in an auxiliary exhaustion processing unit (not shown).

The gas supply units 600 and 650, that is, various nozzles, the electrode 800 and the heater 700 may be assembled to the bottom part 400, together with plates 410 to 440 composing the bottom part 400. As shown in the drawings, the bottom part 400 according to the embodiment may include a lower plate 410 and first to third plates 420, 430 and 440.

The lower plate 410 may be connected with the second body part 300 and it may be assembled to the flowing-gas supply unit and the reaction gas supply unit. The lower plate 410 may be formed of a metal material that is easy and efficient to process, with an excellent mechanical strength and rigidity, such as carbon steel, stainless steel and alloy steel.

The first plate 420 may be located on the lower plate 410, to insulate the lower plate 410. Because of that, the first plate 420 may be formed of a proper material that may be resistant against a high temperature, without contaminating the deposited polycrystal silicon and even with an insulation property, such as quartz. The first plate 420 may be formed of a ceramic material such as silicon nitride, alumina and yttria, rather than quartz. If necessary, such a ceramic material may be coated or lined on a surface of the first plate 420.

The second plate 430 may be located on the first plate 420 and it may be in contact with the heater 700 to supply electricity to the heater 700. Because of that, the second plate 430 may be formed of a conductive material such as graphite, graphite having silicon carbide coated thereon, silicon carbide and graphite having silicon nitride coated thereon. The first plate 420 having the insulation property may be located between the lower plate 410 and the second plate 430, such that the lower plate 410 may be insulated from the second plate 430. The second plate 430 may be in contact with the heater 700 and heat may be generated from the second plate 430. However, the second plate 430 may have a relatively large sectional area where electric currents flow, compared with a sectional area of the heater where electric currents flow. Because of that, the heat generated in the second plate 430 may be much smaller than the heat generated in the heater 700. Also, to reduce the heat generated in the second plate 430, a graphite sheet may be insertedly disposed between the second plate 430 and the heater 700.

When the lower plate 410 and the second plate 430 have conductivity, a leakage current might be generated by the contact between the lower plate 410 and the second plate 430 and the leakage current might flow to the lower plate 410. Because of that, an end of the lower plate 410 may be spaced apart a proper distance from an end of the second plate 430 as shown in the drawings.

In other words, a recess may be formed in the first plate 420 and the second plate 430 may be seated in the recess. For example, a recess having an identical to or larger length as the length of the second plate 430 may be formed in the first plate 420 and the second plate may be seated in the recess of the first plate 420. As a result, a proper area of the first plate 420 may be positioned between the lower plate 410 and the end of the second plate 430, to maintain the insulation between the lower plate 410 and the second plate 430.

As shown in the drawings, the lower plate 410 and the second plate 430 may be insulated from each other by the first plate 420. Alternatively, an insulation ring 900 may be arranged around a rim of the second plate 430, to insulate the lower plate 410 from the second plate 430. At this time, the insulation ring 900 may be formed of quartz and ceramic.

The third plate 440 may be located on the second plate 430 to prevent the polycrystal silicon deposited from the first and second reaction pipes 250 and 350 from being contaminated from the second plate 430, with an insulation property. Because of that, the third plate 440 may be formed of an inorganic material that may not be transformed at a high temperature, namely, high-temperature-resist. The inorganic material may be quartz, silica, silicon nitride, boron nitride, zirconia, silicon carbide, graphite, silicon, vitreous carbide or a compound of them. When the third plate 440 is formed of the carbon containing material such as silicon carbide, graphite and vitreous carbon, the carbon containing material might contaminate the polycrystal silicon. Silicon, silica, quartz, silicon nitride and the like may be coated or lined on a surface of the third plate 440.

Also, each of the second plate and the third plates 440 composing the bottom part 400 may include a plurality of unit-plates, not as a single body. Because of that, the assembly, installation and maintenance of the polycrystal silicon manufacturing apparatus may be more smooth and efficient. In other words, the size of the polycrystal silicon manufacturing apparatus is increased for the mass production of polycrystal silicon. When each of the second and third plates 430 and 440 is formed as a single body, the assembly, installation and maintenance of the polycrystal silicon manufacturing apparatus may be difficult.

Figure 2:
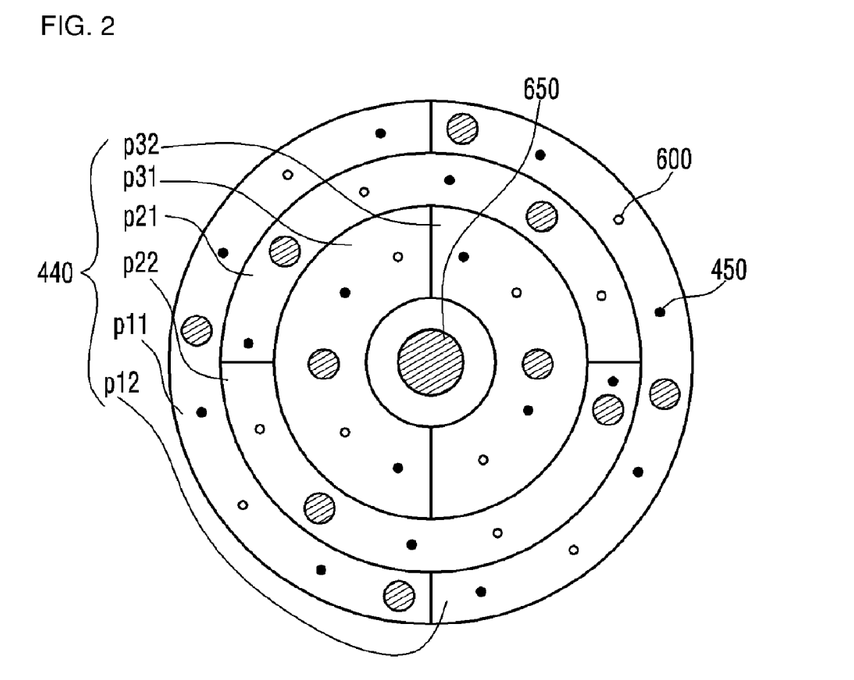
FIG. 2 is a diagram illustrating an example of a plate provided in polycrystal silicon manufacturing apparatus according to the embodiment.
Figure 3:
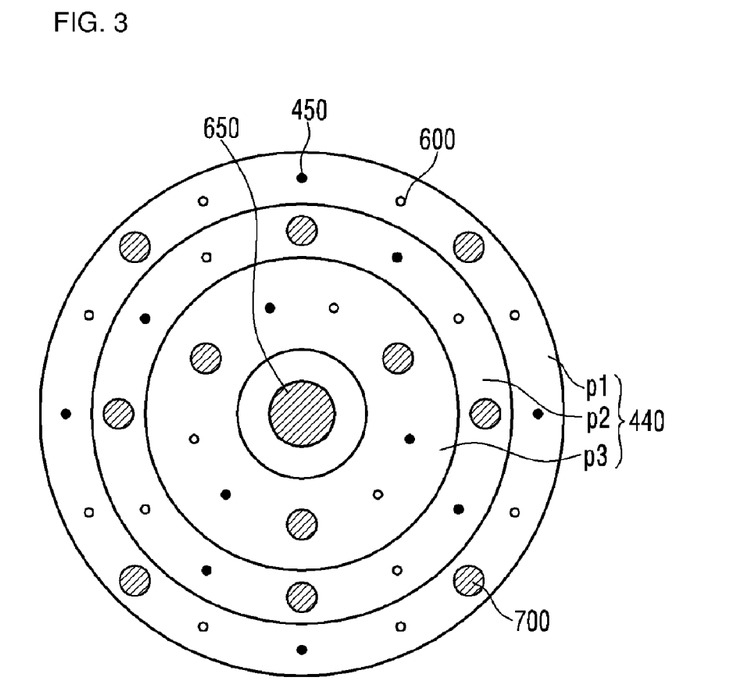
FIG. 3 is a diagram illustrating another example of the plate provided in the polycrystal silicon manufacturing apparatus according to the embodiment.

For example, as shown in FIG. 2, the third plate 440 may be configured of pieces cut away along concentric and diameter directions with respect to the third plate 440. As shown in FIG. 3, the third plate 440 may be configured of ring-shaped pieces having different sizes.

Figure 4:
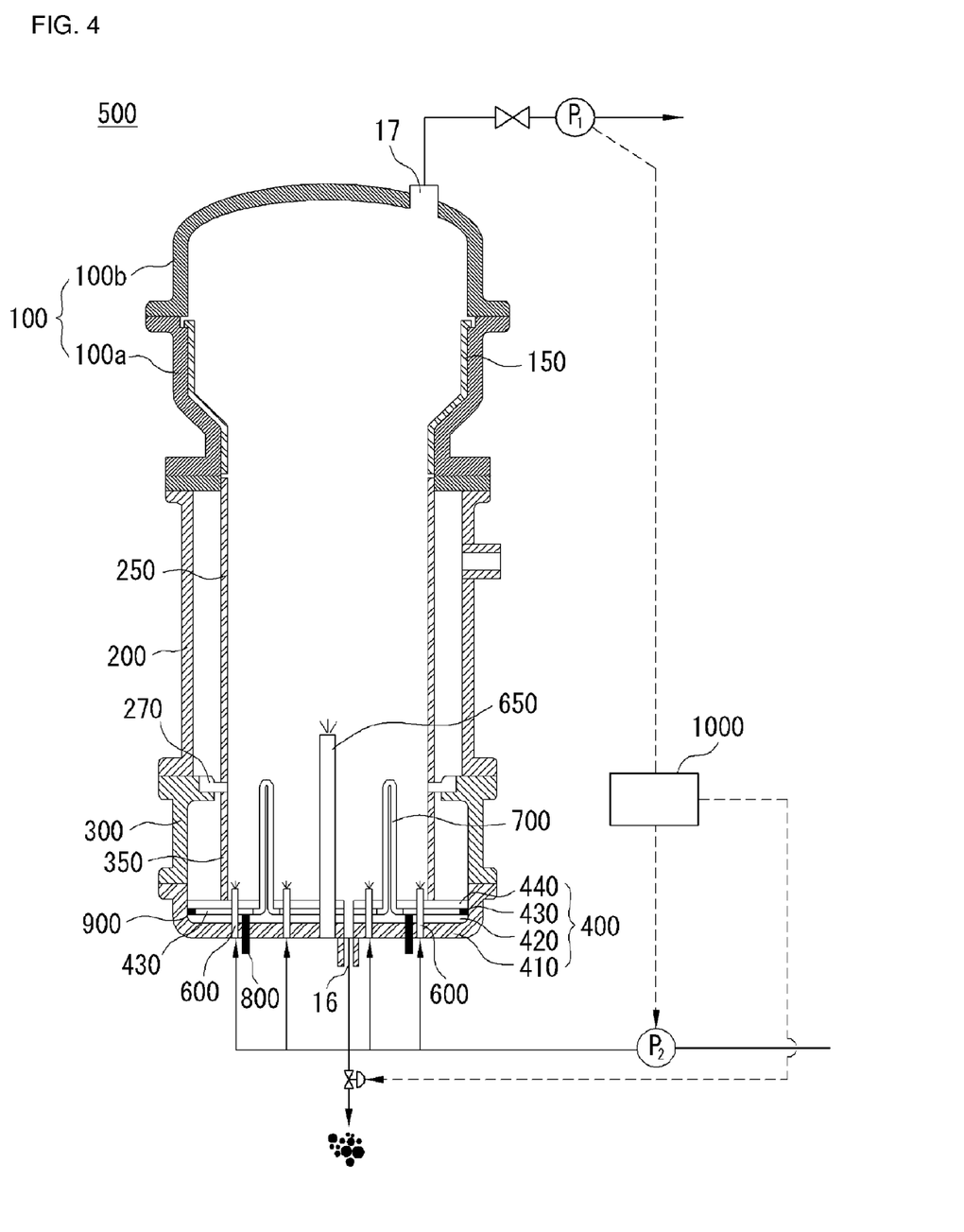
FIG. 4 is a diagram illustrating a method of exhausting silicon from the polycrystal silicon apparatus according to the embodiment, based on an internal pressure.

FIG. 4 is a diagram illustrating a method of exhausting silicon from the polycrystal silicon apparatus according to the embodiment, based on an internal pressure.

The same description as already described above in the structure of the polycrystal silicon manufacturing apparatus in reference to FIG. 1 will be omitted. As shown in FIG. 4, the polycrystal silicon manufacturing apparatus 500 may include a particle outlet 16 arranged under the reaction pipe to exhaust polycrystal silicon particles generated after the silicon deposition reaction.

The particle outlet 16 may be assembled together with the reaction gas supply unit 650 or it may be assembled independent from the reaction gas supply unit 650. Such particle outlet may enable the silicon particles exhausted from the reaction space serially, periodically or intermittently at a required time point.

At this time, the silicon particles may be cooled while they are exhausted via the particle outlet 16. Because of that, predetermined gas such as hydrogen, nitrogen, argon and helium may flow via the particle outlet 16. Alternatively, water, oil, gas or refrigerant may be circulated along a wall surface of the particle outlet 16, to cool hot silicon particles.

In the meanwhile, it is required to prevent the silicon particles from contaminated by impurities while they are exhausted out of the reactor via the particle outlet 16. Because of that, some elements composing the particle outlet that are configured to contact with high temperature silicon product particles may be tubes, liners or molded-materials formed of an inorganic material that is useable in the reaction pipe.

An internal pressure of the polycrystal silicon manufacturing apparatus has much difference in internal areas according to growth of polycrystal silicon particles. Because of that, according to the embodiment, silicon particles may be manufactured by automatically controlling a difference of pressures at the internal areas.

For example, in the polycrystal silicon manufacturing apparatus, pressures at first and second areas provided in the internal area of the reaction pipes 250 and 350 may be measured. The polycrystal silicon manufacturing apparatus may be automatically or manually controlled based on a difference of the two pressures.

The first area possessed by the internal area of the reaction pipes may be an area that receives gas from the nozzle connected to the outside from a lower portion of the reaction pipe, for example, either of a reaction gas supply part 15 and the flowing-gas supply part 14.

A first pressure sensor (P2) may be installed in at least one of the reaction gas supply part 15 and the flowing-gas supply part 14, to measure a corresponding pressure. For example, the first pressure sensor (P2) may be mounted in one of the plurality of the flowing-gas supply parts, to measure a corresponding pressure. Flowing gas may be supplied via the other flowing-gas supply parts.

The internal pressure of the reaction pipes may be measured by the first pressure sensor. The first pressure sensor may be mounted according to the installation structure of the conventional reactor conveniently.

A second pressure sensor (P1) may be installed in the gas outlet 17, to measure the pressure of the second area out of the internal areas of the reaction pipes.

According to this embodiment, the first pressure sensor (P2) may be installed in either of the reaction gas supply unit 650 and the flowing-gas supply unit 600. However, the first pressure sensor (P2) may be installed in any places where a lower pressure of the silicon particle fluidized bed, that is, the pressure of the first area provided in the internal area can be measured. The first area may be an area where a maximum pressure may be measured in the internal area of the silicon particle fluidized bed.

Similarly, the second pressure sensor (P1) may be installed at any places where an upper pressure of the silicon fluidized bed, that is, the pressure of the internal area can be measured. The second area may be an area where a minimum pressure can be measured in the internal area of the silicon particle fluidized bed.

A control unit 1000 may be connected with an internal area 4 via the flowing-gas supply unit 600, the reaction gas supply unit 650 or the gas outlet 17 that are exhausted to the internal area directly or indirectly.

The control unit 1000 may selectively include at least one of a connection pipe required for connection, a fitting part, a manual, semi-automatic or automatic type valve, a digital or analog type pressure or differential pressure gauge and a signal converter or controller having a computing function.

Also, the control unit 1000 may be connected mechanically or in signal circuit, and it may be partially or combinationally connected with control means such as a central control system, a distributed control system (DCS), a local control system.

When reaction gas is supplied to the internal space of the reaction pipe via the reaction gas supply unit 650, silicon elements may be deposited from a surface of seed silicon filled into the reaction space and silicon may be manufactured from such the polycrystal silicon manufacturing apparatus.

In a silicon particle manufacturing step, a layer of silicon particles may be formed on first and second reaction pipe areas. The silicon particles located on the two areas may be mixed with each other, with silicon particles located in at least first reaction area maintaining a status of flowing.

The flow of the silicon particles may refer that a spatial space of silicon particles is changed by flow of gas, movement of gas bubbles and/or movement of surrounding particles with time.

Here, flowing gas may be supplied to a top area of at least the first reaction area to make the particles flow to exchange the silicon particles between the two reaction areas.

With the manufacturing of the polycrystal silicon particles, the polycrystal silicon particles may accumulate in the reaction space and the internal pressure of the reaction pipe may be increased. As a result, a difference between the internal pressure of the first area measured by the first pressure sensor (P2) and the internal pressure of the second area measured by the second pressure sensor (P1) may be increased. At this time, the control unit 1000 may determine whether the difference between the internal pressures is increased to reach a preset first reference value.

The first reference value may be changeable based on an internal environment and the structure of the silicon manufacturing apparatus or it may be set differently based on the areas measured by the first and second pressure sensors.

This is because the internal pressure measured after the silicon deposition reaction can be different according to the structure or internal environment of the silicon manufacturing apparatus. Also, even when the internal environment and structure of the polycrystal silicon manufacturing apparatus is fixed, the internal pressure measured after the silicon deposition reaction may be different according to the measurement positions of the pressure sensors. When the control unit 1000 determines that the difference between the internal pressures reaches the first reference value, the polycrystal silicon particle outlet may be open and the silicon particles may be partially exhausted. The polycrystal silicon particle outlet may be automatically or manually operated.

As the polycrystal silicon particles are exhausted, the height of the silicon fluidized bed may be decreased again and the difference between the internal pressures may be then decreased. Hence, when determining that the difference between the internal pressures reaches a preset second reference value, the control unit 1000 may close the polycrystal silicon particle outlet and it may prevent polycrystal silicon particles from being exhausted any further. Here, the particle outlet may be operated manually or automatically.

Such operation may enable the exhaustion of the polycrystal silicon particles, which is performed in the conventional manufacturing of the polycrystal silicon particles as checked with naked eyes, to be automatically performed by the control of the control unit 1000.

In the meanwhile, according to the embodiment, the difference between the internal pressures are measured by the first and second pressure sensors and the measured difference may be compared with the reference values, to determine the opening and closing of the polycrystal silicon particle outlet based on the result of the comparison. Alternatively, a pressure sensor may be mounted in the gas outlet or the flowing-gas supply unit and only the pressure measured by the pressure sensor in the gas outlet or the flowing-gas supply unit may be compared with a reference pressure value. At this time, when the measured pressure is the reference pressure value or more, the polycrystal silicon particles may be controlled to be exhausted via the polycrystal silicon particle outlet formed in the reaction pipe.

At this time, the reference pressure value may be variable according to an operation pressure. Here, the operation pressure may be a pressure preset to operate the polycrystal silicon manufacturing apparatus stably.

For example, when the operation pressure is 2.0 bar (gauge pressure), the reference pressure value may be 3.5 bar (gauge pressure). In case of 4 bar (gauge pressure), the reference pressure value may be 5.5 bar (gauge pressure). In other words, the particle outlet may be controlled to be open, when a reference pressure value with respect to the operation pressure is 0.5 bar or more (gauge pressure).

According to the embodiment, the reference pressure value with respect to the operation pressure is 0.5 bar or more and it may be lowered.

Therefore, the reference pressure value may not be limited to a specific value and it may be variable according to the internal environment or structure of the polycrystal silicon manufacturing apparatus. Because of that, the reference pressure value with respect to the operation pressure may be variable. In the meanwhile, the difference between the pressures in the reaction space or the reference value of the flowing gas supply pressure may be determined based on the size of the growing silicon particle, and the production and exhaustion time point of the polycrystal silicon particle may be adjusted by controlling the size of the silicon particle. Also, the size of the silicon particle may be differentiated by one of the number of the seed silicons, the concentration of the reaction gas, the reaction temperature, the reaction pressure and the quantity of the flowing gas. The embodiment discloses the factors that affect the size of the silicon particle. However, the silicon particle size may be differentiated by internal environments and other conditions of the polycrystal silicon manufacturing apparatus, rather than the factors mentioned above.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments. Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A polycrystal silicon manufacturing apparatus comprising:
    a reaction pipe comprising silicon particles provided therein;
    a flowing-gas supply unit configured to supply flowing gas to the silicon particles provided in the reaction pipe; and
    a first pressure sensor configured to measure a pressure of a first area in the reaction pipe;
    a second pressure sensor configured to measure a pressure of a second area in the reaction pipe; and
    a control unit configured to operate a particle outlet to exhaust polycrystal silicon formed in the reaction pipe outside, when a difference between a first pressure measured by the first pressure sensor and a second pressure measured by the second pressure sensor is a reference pressure value or more.

2. The polycrystal silicon manufacturing apparatus of claim 1, wherein the first pressure sensor is arranged in the flowing-gas supply unit.

3. The polycrystal silicon manufacturing apparatus of claim 1, further comprising:
a gas outlet configured to exhaust gas generated in silicon deposition reaction in the reaction gas pipe outside,
wherein the second pressure sensor is arranged in the gas outlet.

4. The polycrystal silicon manufacturing apparatus of claim 1, wherein the first area is an area in which a maximum pressure is measured in the reaction pipe and the second area is an area in which a minimum pressure is measured in the reaction pipe.

5. The polycrystal silicon manufacturing apparatus of claim 1, wherein the reaction pipe is formed of a material selected from a group configured of quartz, silica, silicon nitride, boron nitride, zirconia, yttria, silicon carbide, graphite, silicon and a vitreous carbon.

6. The polycrystal silicon manufacturing apparatus of claim 5, wherein one of silicon, silica, quartz and silicon nitride is lined on an inner wall of the reaction pipe, when the reaction pipe is formed of a carbon containing material.

7. A polycrystal silicon manufacturing apparatus comprising:
a reaction pipe comprising silicon particles provided therein;
a flowing-gas supply unit configured to supply flowing gas to the silicon particles provided in the reaction pipe; and
a pressure sensor arranged in the flowing-gas supply unit; and
a control unit configured to operate a particle outlet to exhaust polycrystal silicon formed in the reaction pipe outside, when a pressure measured by the pressure sensor is a reference pressure value or more.

8. The polycrystal silicon manufacturing apparatus of claim 7, wherein the reaction pipe is formed of a material selected from a group configured of quartz, silica, silicon nitride, boron nitride, zirconia, yttria, silicon carbide, graphite, silicon and a vitreous carbon.

9. The polycrystal silicon manufacturing apparatus of claim 8, wherein one of silicon, silica, quartz and silicon nitride is lined on an inner wall of the reaction pipe, when the reaction pipe is formed of a carbon containing material.

10. The polycrystal silicon manufacturing apparatus of claim 7, further comprising: a bottom part of the reaction pipe having the flowing-gas supply unit assembled thereto, wherein the bottom part comprises a lower plate, a first plate, a second plate and a third plate that are multilayered sequentially.

11. The polycrystal silicon manufacturing apparatus of claim 10, wherein each of the second and third plates comprises a plurality of unit-plates.

12. The polycrystal silicon manufacturing apparatus of claim 10, wherein an insulation ring is provided to cover a rim of the second plate.

13. The polycrystal silicon manufacturing apparatus of claim 10, wherein an end of the second plate is spaced apart a predetermined distance from a surface of the lower plate.

14. The polycrystal silicon manufacturing apparatus of claim 10, wherein a predetermined area of the first plate is located between the lower plate and an end of the second plate.

15. A method of manufacturing polycrystal silicon comprising steps of:
generating silicon deposition reaction by supplying reaction gas and flowing gas to a reaction pipe;
measuring a first pressure of a first area in the reaction pipe;
measuring a second pressure of a second area that is different from the first area in the reaction pipe; and
exhausting polycrystal silicon generated in the reaction pipe, when a difference between the first pressure and the second pressure is a reference pressure value or more.

16. The method of manufacturing the polycrystal silicon of claim 15, wherein the first area is an area in which the flowing gas or the reaction gas is filled in the reaction pipe.

17. The method of manufacturing the polycrystal silicon of claim 15, wherein the second area is an area in which gas generated during the silicon deposition reaction is exhausted.

* * * * *